United States Patent Office 3,501,222
Patented Mar. 17, 1970

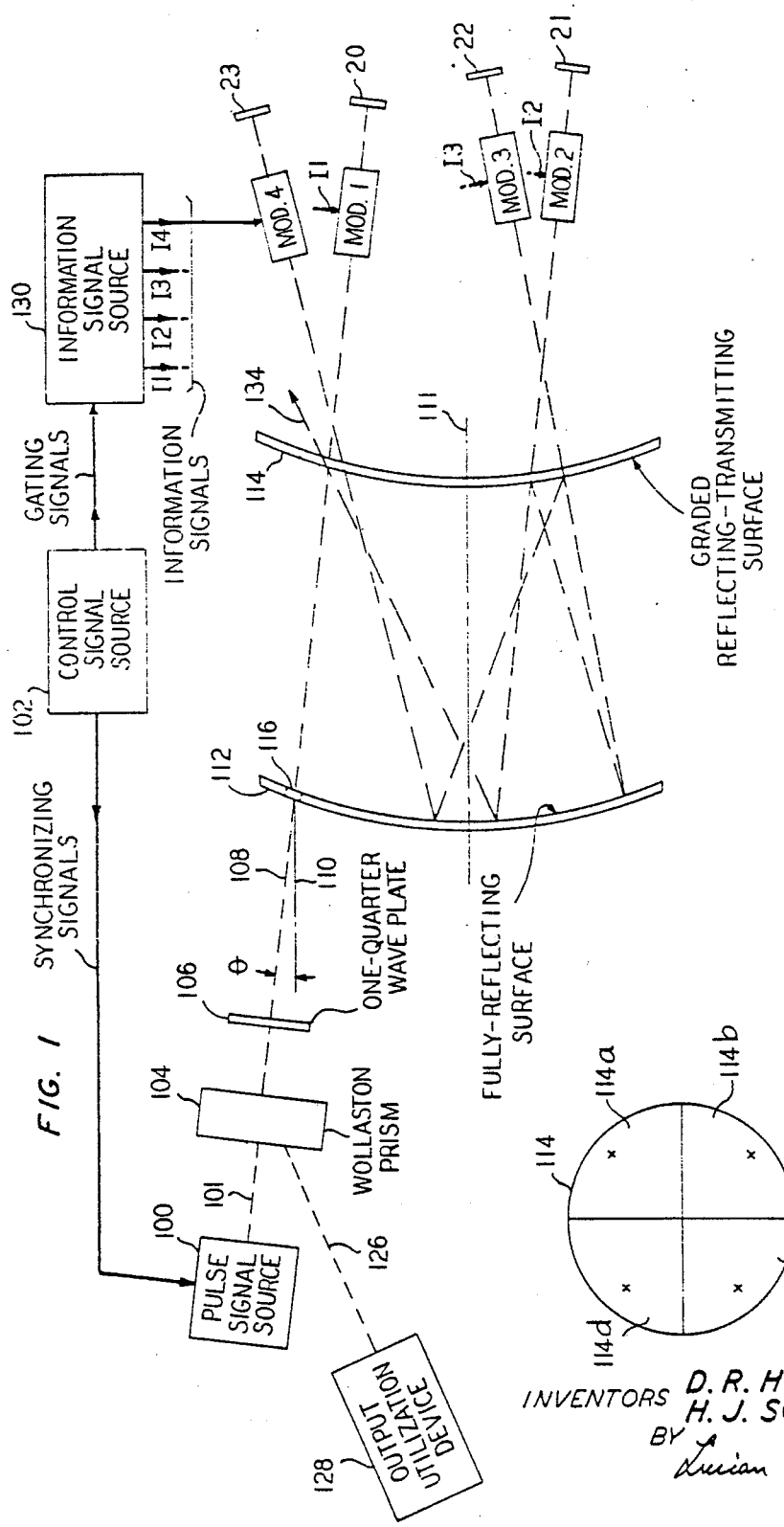

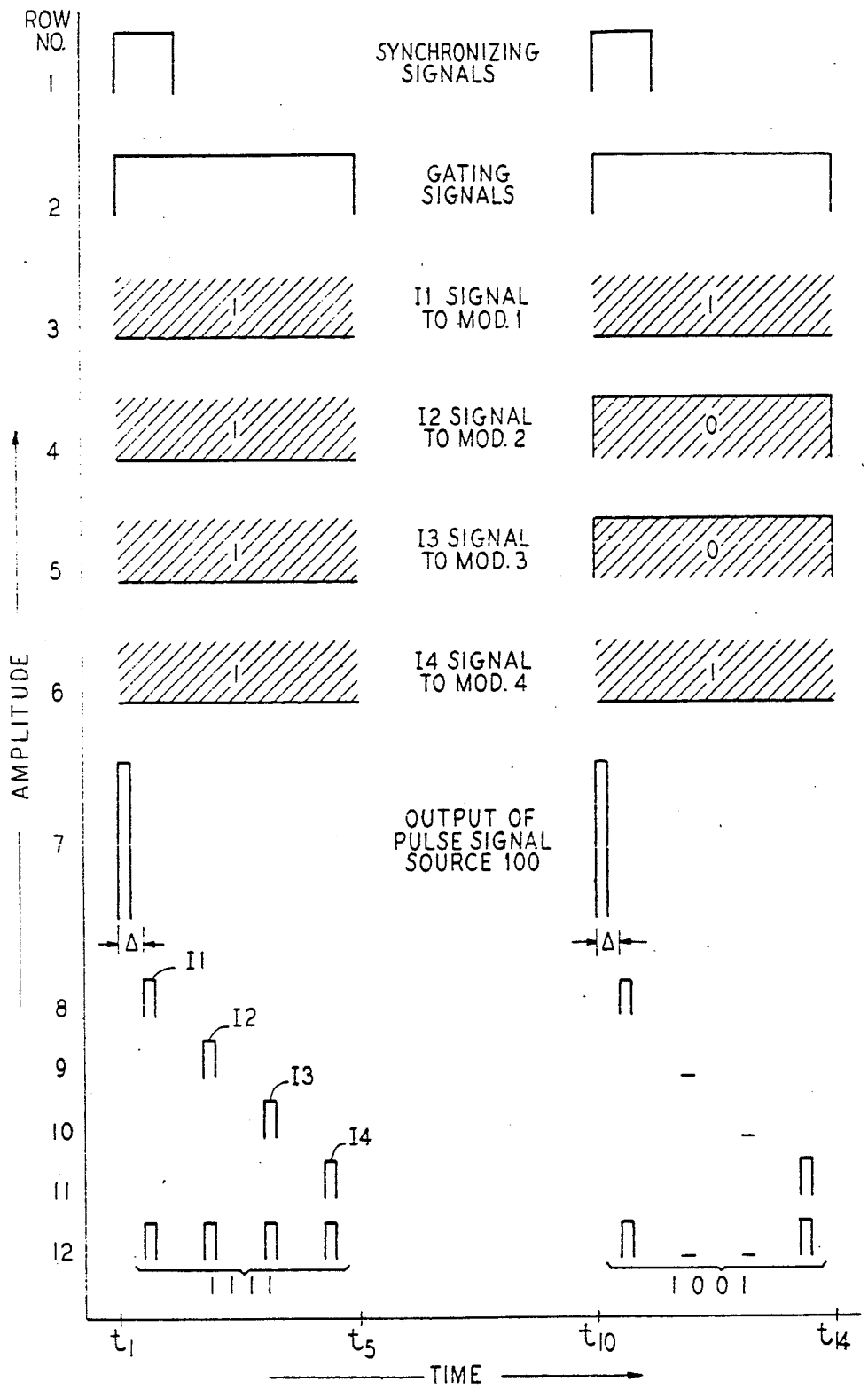

3,501,222
OPTICAL PULSE GENERATOR
Donald R. Herriott, Morris Township, Morris County, and Harry J. Schulte, Jr., Berkeley Heights, N.J., assignors to Bell Telephone Laboratories, Incorporated, New York, N.Y., a corporation of New York
Filed Nov. 23, 1965, Ser. No. 509,388
Int. Cl. H01s 3/10
U.S. Cl. 350—171　　　　　　　　　　　　7 Claims

ABSTRACT OF THE DISCLOSURE

An optical pulse generator includes two spaced-apart spherical mirror members oriented in a nested facing relationship along a common main axis. The facing concave surface of one member is fully reflecting, whereas the facing convex surface of the other member exhibits a graded reflecting-transmitting characteristic. Optical energy transmitted through the other member is propagated along a plurality of paths, each of which includes a modulator unit and a fully reflecting mirror. A single optical pulse directed at the structure along an input path is successively divided by the other member. Pulses propagated through the modulators are reflected back to the spherical members and subsequently directed toward the input path via paths of different lengths. In turn, a dispersive arrangement in the input path directs selected ones of the reflected pulses along a spatially distinct output path.

---

This invention relates to signal translating and more particularly to an arrangement for generating pulses suitable for use in an optical information processing system.

It is known to operate a laser in a mode wherein the output thereof comprises a series of very narrow pulses that are relatively widely spaced apart. In particular, the output pulses of one specific illustrative such laser are each characterized by a width of approximately 0.5 nanosecond. The pulse period of this specific laser is about 10 nanoseconds. L. E. Hargrove Patent 3,412,251, issued Nov. 19, 1968, describes a pulsed laser of this general type.

The information-handling capacity per unit time of a system that is designed to process narrow nanosecond pulses can be significantly increased if the pulse train output of a Hargrove-type laser is modified. Specifically, the information-handling capacity of the pulsed output thereof can be increased by generating a plurality of additional pulses during the aforenoted relatively wide interpulse interval. In turn, the plural optical pulses generated in response to each single signal supplied by the laser are adapted to be processed by arrangements such as optical transmission lines and memories.

An object of the present invention is the improvement of optical signal processing systems.

More specifically, an object of this invention is an arrangement for generating a pulse train suitable for efficient use in an optical information signal processing system.

Another object of the present invention is a reliable optical pulse generator that is characterized by simplicity of design, compactness and ease of fabrication.

These and other objects of the present invention are realized in a specific illustrative embodiment thereof that comprises first and second spaced-apart spherical mirrors that are oriented in a facing nested relationship to each other. The inner or facing concave surface of the first mirror fully reflects any incident radiation directed thereat, whereas the facing convex surface of the second mirror exhibits a graded reflecting-transmitting characteristic. An input optical pulse is directed through an aperture in the first mirror and along a path that is non-orthogonal to the main axis of the mirrors. This input pulse impinges upon a first area of the facing surface of the second mirror. A portion of the impinging pulse is transmitted through the second mirror to a first modulation channel. The remaining portion of the pulse is reflected back to the fully-reflecting surface of the second mirror.

In accordance with the invention, an optical pulse of diminishing amplitude is successively reflected between the two mirrors. Each time that this pulse impinges upon a selected area of the facing surface of the second mirror, a portion of the pulse is transmitted to an associated modulation channel. The reflecting-transmitting characteristics of the selected areas of the second mirror are graded such that the transmitted pulses routed to the respective modulation channels are equal in amplitude. In this way, the input pulse is split into a prescribed number of equal-amplitude signals that are respectively directed to a multiplicity of modulation channels.

Each modulation channel includes an optical modulator unit and a fully-reflecting mirror. Any signal that passes through an unactivated modulator unit is reflected back therethrough by its associated fully-reflecting mirror. This reflected signal is then directed by the first and second mirrors through the aforenoted aperture in the first mirror and along an output path to a utilization device. On the other hand, any signal that propagates through an activated modulator unit is selectively modified in such a manner that that signal is not directed to the utilization device.

The total lengths of the various paths traversed by pulses in propagating through the assemblage are respectively different. In particular, these lengths are so proportioned that each pulse which is reflected back through the assemblage to the output path reaches the utilization device in a different one of a plurality of spaced time slots. As a result, the embodiment responds to a single applied input pulse to produce an output sequence of spaced equal-amplitude pulses (or no-pulses). Whether or not an output pulse appears in its assigned time slot is, of course, a function of the condition of its associated modulator unit.

It is a feature of the present invention that an optical pulse arrangement include two nested spaced-apart spherical mirrors responsive to a single input optical beam for generating a plurality of focused equal-amplitude output beams.

It is another feature of this invention that the facing surface of one mirror fully reflect any radiation incident thereon and that the facing surface of the other mirror exhibit a graded reflecting-transmitting characteristic.

It is a further feature of the present invention that a portion of each optical pulse incident on the facing surface of the other mirror be directed to a modulation channel and that each such channel include an optical modulator unit and an associated fully-reflecting mirror, whereby the state of each modulator unit determines whether or not the pulse directed thereat is propagated back through the parallel mirror assembly to an output utilization device.

It is still another feature of this invention that the total lengths of the respective paths traversed by pulses in reaching the output utilization device be different, so that any pulses directed to the device arrive thereat in spaced-apart sequence.

A complete understanding of the present invention and of the above and other objects, features and advantages thereof may be gained from a consideration of the following detailed description of a specific illustrative embodiment thereof presented hereinbelow in connection with the accompanying drawing, in which:

FIG. 1 shows a specific illustrative optical pulse generating arrangement made in accordance with the principles of the present invention;

FIG. 2 is a side view of one of the mirrors included in the FIG. 1 arrangement; and FIG. 3 depicts various waveforms representative of the mode of operation of the arrangement shown in FIG. 1.

The arrangement of FIG. 1 includes a pulse signal source 100 which may, for example, comprise a pulsed laser of the type described in the aforecited Hargrove patent. Synchronizing signals are applied to the source 100 from a control signal source 102. In response to each such synchronizing signal (represented in row No. 1 of FIG. 3), the source 100 emits a narrow pulse of electromagnetic energy of the general form shown in row No. 7 of FIG. 3.

Illustratively, the input pulse emitted by the source 100 of FIG 1 comprises a narrow burst of plane-polarized light. This emitted pulse is directed through a conventional Wollaston prism 104 and a standard one-quarter wave plate 106, which are oriented in a manner well-known in the art to cause the polarization of the electromagnetic energy that emerges from the right-hand side of the plate 106 to be circular in nature.

The propagation vector of the optical pulse that emerges from the plate 106 shown in FIG. 1 is directed along a dashed-line path 108 that is disposed at an angle $\theta$ with respect to a reference horizontal line 110. In turn, the line 110 is parallel to the main axis 111 of first and second spherical mirror members 112 and 114 which are oriented in a nested spaced-apart facing relationship. The term "nested" as employed herein is intended to specify that the concave (or convex) surfaces of the mirror members 112 and 114 both face in the same direction along the main axis 111. Thus, as shown in FIG. 1, the concave surfaces of the members 112 and 114 face to the right and the convex surfaces thereof face to the left.

The first mirror member 12 includes therein an aperture 116 through which the aforenoted optical pulse propagates along the depicted dashed-line path. Except for the aperture 116, the inner facing surface of the mirror 112 (that is, the concave surface thereof that faces the second mirror member 114) comprises any conventional medium that exhibits the characteristic of fully reflecting optical energy incident thereon.

Selected portions of the inner facing surface of the second mirror member 114 are adapted to exhibit a graded reflecting-transmitting characteristic. In other words, each such portion transmits a preselected part of the pulse incident thereon and reflects the remaining part. The reflected part propagates along an oblique dashed-line path back to the fully-reflecting surface of the mirror member 112. The transmitted part traverses the member 114 to an associated modulation channel of the type described below.

Various techniques for treating a mirror member to cause it to exhibit a reflecting-transmitting or beam splitting characteristic are well-known in the optical art. In accordance with any of these techniques, the particular reflecting-transmitting property of each one of the noted portions of the member 114 may be selectively controlled.

The convex surface of the mirror 114 of the specific illustrative embodiment shown in FIG. 1 includes four contiguous quadrant areas to which a portion of the input optical pulse is successively directed. These areas are shown in FIG. 2 wherein they are respectively designated 114a through 114d.

It is apparent that the areas 114a through 114d of FIG 2 need not encompass complete quadrants. Only that much of each quadrant upon which the incident optical beam actually impinges need be treated to exhibit a graded reflecting-transmitting characteristic. The particular portion of the areas 114a through 114d upon which the propagation vectors of the multiply-reflected optical pulses may be considered to impinge are indicated by x's.

The area 114a shown in FIG. 2 is directly in the path of the input pulse that enters the inter-mirror space via the aperture 116. In accordance with the present invention, the requisite reflecting-transmitting characteristic of the area 114a (and of each of the other graded areas) is determined from the expression:

$$R_n = \frac{1-\frac{n}{N}}{1-\left(\frac{n-1}{N}\right)} \quad (1)$$

where $R_n$ is the reflectivity of the nth one of the graded areas, N equals the total number of such areas, and wherein the areas are numbered from 1 through $n$ starting with the area 114a and proceeding in a clockwise direction. From expression (1) it is evident that the reflectivity $R_1$ of the area 114a is ¾ or 0.750. In other words, if an input pulse having an amplitude of four units is directed at the area 114a, a three-unit amplitude pulse is reflected back from 114a to the fully-reflecting surface of the member 112, and a pulse of unit amplitude is transmitted through the member 114 to an associated modulation channel which includes a first modulator unit designated MOD1 and a fully-reflecting mirror member 20.

In accordance with the principles of the present invention it is determined from expression (1) that the respective reflectivities of the areas 114b through 114d of the illustrative arrangement shown in FIGS. 1 and 2 are 0.667, 0.500 and 0.000. Equivalently, the area 114d may simply include an aperture through which the multiply-reflected optical pulse eventually leaves the space between the mirrors 112 and 114.

By grading the reflecting-transmitting characteristics of the aforenoted areas 114a through 114d in the manner specified, an optical pulse of unit amplitude is directed along each of the four depicted modulation channels. It is evident from FIG. 1 that each of these unit-amplitude pulses traverses a different-length path to its respective modulator unit. Similarly, it is apparent that that portion of each pulse that is reflected back from the mirror members 20 through 23 into the inter-mirror space between the members 112 and 114 propagates along a different characteristic path length to reach the entry-exit aperture 116. The time between the leading edges of adjacent such pulses is given to a good approximation by the expression:

$$T = \frac{\sqrt{d^2 + \frac{\pi^2 a^2}{N^2}}}{C \cos \theta} \quad (2)$$

where $\theta$ and N are as defined earlier above, C is the velocity of light, $d$ is the distance between the mirrors 112 and 114 as measured along the main axis 111 thereof and $a$ is the radius of the optical spot pattern on the concave surface of the mirror 112. For one specific illustrative embodiment in which $d$ is 15 centimeters, $a$ is 1 centimeter, N is 4 and $\theta$ is 10 degrees, this inter-pulse spacing is about 1.04 nanoseconds.

Illustratively, each of the four modulator units MOD1 through MOD4 shown in FIG. 1 comprises an element of potassium dihydrogen phosphate (KDP). By applying respective electrical control signals to such modulator units, the conditions of the units may be selectively controlled to determine whether or not pulses propagated therethrough are eventually routed back to an output path 126 and an output utilization device 128. Illustratively, the modulator units are controlled by electrical information signals I1 through I4 supplied thereto by an information signal source 130 in response to the application to the source 130 of a gating signal from the control source 102. These information signals are respectively applied to the units MOD1 through MOD4 via a plurality of electrical leads. In the interest of not unduly cluttering FIG. 1, only the information-carrying lead extending to the unit MOD4 is actually shown in the drawing.

Assume that a particular modulator unit, say the unit MOD3, does not have an electrical control potential applied thereto from the source 130. (The absence of an electrical potential will be considered herein to be representative of a "1" information signal.) As a result, the circular polarization condition of the pulse that propagates through the unit MOD3 is unchanged in transit therethrough. In subsequently propagating back through the one-quarter wave plate 106, this circularly-polarized pulse is converted to a plane-polarized burst whose plane of polarization is rotated 90 degrees from that characteristic of the original input pulse emitted by the signal source 100. Consequently, and due to the inherent birefringent property of the Wollaston prism 104, this plane-polarized pulse is directed along the output path 126 which, as seen in FIG. 1, is spatially distinct from the depicted input pulse path 101 that extends between the source 100 and the prism 104.

On the other hand, assume that an electrical control potential, indicative of a "0" information signal, is applied to the modulator unit MOD3 from the source 130 during the time interval in which an optical pulse traverses the unit MOD3. The effect of so activating the unit MOD3 is to cause the polarization condition of the pulse propagated therethrough to be altered. In particular, the circularly polarized pulse is converted to an elliptically-polarized one. Subsequently, in passing through the one-quarter wave plate 106, the polarization condition of the reflected-back pulse remains elliptical (but in a different sense). In turn, the Wollaston prism 104 responds to the elliptically-polarized pulse by directing substantially all of the energy thereof along the input path 101, whereby almost none of the pulse energy propagates along the output path 126 to the utilization device 128.

Thus, by selective electrical control of the modulator units MOD1 through MOD4, the nature of the pulse train delivered to the output utilization device 128 may be easily controlled. For example, in the absence of the application of control potentials to the units MOD1 through MOD4 (indicative of four "1" signals respectively supplied thereto by the source 130), the four time-spaced pulses reflected back from the mirror members 20 through 23 are, for the reasons specified above, eventually directed in sequence to the output utilization device 128. FIG. 3 illustrates the particular case wherein four "1" representations are applied to the modulator units from the information signal source 130 in time coincidence with the application of a gating signal from the source 102 to the source 130. The relative times of arrival of the reflected-back pulses at the utilization device 128 are indicated in rows 8 through 11 of FIG. 3. Row No. 12 is simply a composite depiction of the complete pulse train that is delivered to the device 128 during the time interval designated $t_1$ through $t_5$. It is noted that the first pulse (representative of the information signal I1) supplied to the device 128 arrives thereat after a transit time delay of $\Delta$ seconds relative to the leading edge of the initiating pulse supplied at time $t_1$ by the source 100.

During the time interval marked $t_{10}$ through $t_{14}$ in FIG. 3, the information signals respectively represented in rows 3 through 6 are applied to the modulator units MOD1 through MOD4 of FIG. 1. In response thereto, the reflected-back pulses corresponding to the information signals I1 and I4 are routed to the output utilization device 128, whereas the reflected-back pulses corresponding to the information signals I2 through I3 are not directed thereto. The resulting sequence of pulses actually delivered to the device 128 in the interval $t_{10}$ through $t_{14}$ is shown in row No. 12 of FIG. 3. As indicated in FIG. 2, this sequence is representative of the binary word 1001.

It is apparent from an inspection of the last row of FIG. 3 that the repetition rate of the narrow pulse sequences delivered to the device 128 is four times the rate at which pulses are generated by the signal source 100. As a result, the information-handling capacities of the optical sequences delivered to the device 128 are enhanced over the capacity inherent in the characteristic output pulses of the source 100. It is significant to note that this increase in capacity is achieved through the action of modulator units which, while individually operating at a maximum rate R, participate in the generation of an output pulse train having a rate 4R.

It is noted that a portion of each pulse that is reflected back through its associated modulator unit from the fully-reflecting mirrors 20 through 23 is lost due to reflection at the mirror 114. For example, a portion of the reflected-back pulse that propagates from right to left through the unit MOD1 is reflected from the reflecting-transmitting mirror 114 in the direction of arrow 134. This portion of the pulse constitutes lost energy. The remaining or information-carrying portion of this reflected-back pulse is transmitted through the mirror 114 and then, as described above, is directed along the dashed line path through the aperture 116 to the routing arrangement that includes the plate 106 and the prism 104.

In addition, energy is lost whenever a reflected-back pulse impinges upon the facing surface of the mirror 114 in transit to the aperture 116. For example, the pulse that is reflected back through the modulator unit MOD2 and through the mirror 114 is reflected from the mirror 112 and directed at the area 114a. In turn, a prescribed portion of this pulse is reflected from the area 114a and propagated through the aperture 116 to the plate 106. However, the remaining portion of the reflected-back pulse incident on 114a is transmitted therethrough in the direction of the arrow 134 and constitutes lost energy.

In accordance with the principles of the present invention, successively-reflected optical pulses are directed to impinge upon a plurality of graded areas. These impinging pulses form a number of spots of finite size that are spaced without overlap in a three-dimensional array within the diameter of the spherical mirror 114.

Advantageously, the radii of curvature of the spherical mirror members 112 and 114 are selected such that the equal-amplitude optical beams that are transmitted through the mirror 114 are focused to direct a maximum amount of energy through the modulator units MOD1 through MOD4. In achieving this desired focusing action for a particular spatial configuration, the radius of curvature of the mirror 114 is advantageously selected to be greater than that of the mirror 112.

Thus, there has been described herein a specific exemplary compact assembly which illustratively embodies the principles of the present invention. As set forth above, the combination responds to a single input optical pulse by generating a sequence of focused reduced-amplitude optical pulses suitable for efficient use in an optical information processing system.

It is to be understood that the above-described arrangements are only illustrative of the application of the principles of the present invention. In accordance with these principles, numerous other arrangements may be devised by those skilled in the art without departing from the spirit and scope of the invention. For example, although the modulator units included in the FIG. 1 arrangement are described above as being of the type that selectively control the polarization condition of pulses that propagate therethrough, it is, of course, feasible to substitute therefor modulator units that affect incident pulses in some other fashion. For instance, each such unit may comprise a conventional optical deflection device which when activated routes the propagation vector of the pulse propagated therethrough along a path that does not impinge upon its associated fully-reflecting mirror.

In addition, although emphasis above is directed to an output sequence comprising evenly-spaced pulses, it is to be understood that the principles of the present invention are not restricted thereto. If desired, the various path lengths traversed by pulses can be proportioned such that the output pulses are not evenly spaced. Any desired pulse spacing can be achieved simply by selective positioning of the mirror members 20 through 23 which, as shown in FIG. 1, are each spaced from the mirror 114 by the same path length. Alternatively, the relative dimensioning of the illustrative assembly may be controlled by interposing electro-optic elements (not shown) in the various pulse propagation paths. By electrically varying the index of refraction of each such element, the effective path length of radiant energy propagated therethrough may be selectively and easily altered.

Also, it is to be understood that the principles of this invention are not limited to a pulse generator that includes four modulation channels. In accordance with the invention, the number of channels may be varied as desired to achieve any required multiplication of the natural repetition rate of the pulsed output of the signal source 100.

What is claimed is:

1. In combination, a first member having a plurality of partially reflective areas defined thereon, means for directing at least a prescribed portion of an input optical pulse along a continuous propagation path to impinge in succession on said areas, said areas being formed to exhibit graded reflecting-transmitting characteristics such that the portion of said input pulse which is transmitted through each of said areas is of equal amplitude.

2. A combination as in claim 1 wherein said first member comprises a first spherical mirror.

3. A combination as in claim 2 wherein said directing means includes a second spherical mirror which is spaced apart from said first mirror and oriented in a nested relationship with respect to said first mirror, said mirrors being nested such that the concave side of said second mirror faces the convex side of said first mirror.

4. A combination as in claim 3 wherein said second mirror includes an aperture therethrough, and wherein said directing means further includes a pulse signal source positioned in spaced alignment with said aperture for propagating said input pulse through said aperture into the space between said first and second spherical mirrors for multiple reflection therein and successive transmission of an equal-amplitude portion of said pulse through said graded areas.

5. A combination as in claim 4 wherein each equal-amplitude pulse that is transmitted through said first spherical mirror is propagated along a distinct modulation channel that includes a fully-reflecting mirror and a modulator unit, each such unit being interposed between its associated fully-reflecting mirror and said first spherical mirror in the path of a transmitted pulse.

6. A combination as in claim 5 still further including a Wollaston prism and a one-quarter wave plate interposed in that order between said signal source and said aperture.

7. In combination in an optical pulse generator, first and second spaced-apart spherical mirrors having a colinear main axis and being oriented in a nested relationship with respect to each other, said first mirror having a fully-reflecting coating on the concave surface thereof, and said second mirror having a graded reflecting-transmitting coating on the convex surface thereof.

References Cited

UNITED STATES PATENTS

| | | | |
|---|---|---|---|
| 3,170,066 | 2/1965 | Ogland | 250—199 |
| 3,256,443 | 6/1966 | Moore. | |
| 3,215,032 | 11/1965 | Lang | 350—171 |
| 3,277,393 | 10/1966 | Nicolai. | |
| 3,302,027 | 1/1967 | Fried | 250—199 |

OTHER REFERENCES

Mohler: American Journal of Physics, Optical Filters, December 1952, vol. 20, No. 9, pp. 583–588.

RONALD L. WIBERT, Primary Examiner

P. K. GODWIN, Jr., Assistant Examiner

U.S. Cl. X.R.

250—199; 332—41; 350—150, 294, 299